Sept. 15, 1925. Re. 16,168
E. CHARLAND
FIRE HYDRANT
Original Filed March 30, 1918
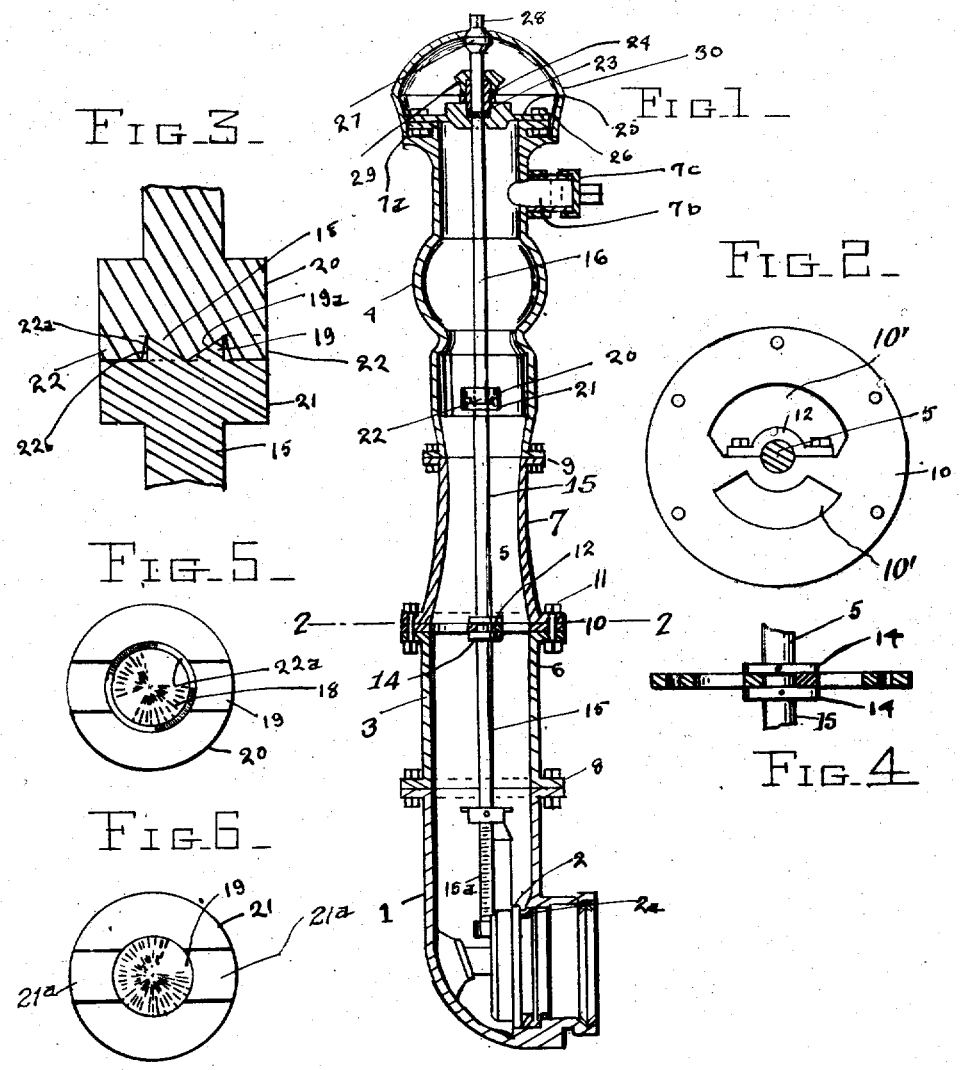
INVENTOR
ERNEST CHARLAND
Joseph J. O'Brien
ATTORNEY Reissued Sept. 15, 1925.

Re. 16,168

UNITED STATES PATENT OFFICE.

ERNEST CHARLAND, OF INDIAN ORCHARD, MASSACHUSETTS, ASSIGNOR OF ONE-HALF TO DENNIS J. McNAMARA, OF SPRINGFIELD, MASSACHUSETTS.

FIRE HYDRANT.

Original No. 1,306,578, dated June 10, 1919, Serial No. 225,738, filed March 30, 1918. Application for reissue filed September 7, 1920. Serial No. 408,770.

*To all whom it may concern:*

Be it known that ERNEST CHARLAND, a citizen of the Dominion of Canada, residing at Indian Orchard, in the county of Hampden and State of Massachusetts, has invented certain new and useful Improvements in Fire Hydrants, of which the following is a specification.

This invention relates to improvements in fire hydrants, the object of the invention being to provide an improved form of fire hydrant which embodies a valve operating rod having a detachable upper member which is arranged in the post, so that when the post becomes accidentally broken off, said upper member of the said rod separates from the lower portion of the rod and the valve remains closed, thereby preventing any flow of water, and furthermore, should the post become accidentally broken off while the water is flowing or in use, the lower portion of the rod can be used for closing the valve, and thus prevent any loss of water.

Another object of the invention is to provide an improved form of fire hydrant which embodies a stand pipe comprising a lower member and an upper member and also embodying a ring which is detachably secured between said upper and lower members of the stand pipe, the said ring providing a bearing for the valve operating rod, and means to coact with the ring to prevent the said rod from moving vertically in the event that the post should be broken off and the upper member of the rod detached from the lower member thereof.

With the above and other objects in view the invention consists in the construction, combination and arrangement of devices hereinafter described and claimed.

In the accompanying drawing:—

Figure 1 is a vertical central sectional view of a fire hydrant constructed and arranged in accordance with my invention.

Figure 2 is a horizontal sectional view of the same on the plane indicated by the line 2—2 of Fig. 1.

Fig. 3 is a detailed sectional view of the joint between the members of the valve operating rod.

Fig. 4 is a similar view of the ring.

Figure 5 is a bottom plan view of the head 20.

Figure 6 is a top plan view of the head 21.

In the embodiment of the invention shown in the accompanying drawing, the body of the hydrant is indicated at 1, the valve at 2, the stand pipe at 3, the post at 4, and the rod for operating the valve is indicated at 5.

The stand pipe comprises a lower member 6 and an upper member 7. The lower member is bolted at its lower end to the upper side of the body as at 8 and the upper member has its upper end bolted to the lower end of the post as at 9. A ring 10 is interposed between the upper end of the lower member 6 and the lower end of the upper member 7 and said members and said ring are secured together by means of bolts 11. The ring has openings 10′ therein to permit the flow of water therethrough and is also provided with a central bearing 12 through which the rod 5 extends. The rod may be turned freely in the bearing but is prevented from moving vertically by means of a pair of collars 14 which are secured on the rod and one of which bears on the upper side of the ring, the other collar bearing against the lower side of the ring as shown.

A valve operating rod includes of a lower member or section 15 which is provided on its lower end with screw threads 15ª whereby the valve 2 may be moved toward and away from its seat 2ª when said valve rod is rotated. The valve operating rod also includes an upper member or section 16 disposed in axial alignment with the lower rod section 15. The upper end of the valve rod section or member 15 is formed or provided with a head or collar 21 (see Fig. 6) and this head or collar is formed with an upstanding centrally located portion 19 having a tapering recess 19ª formed therein. The lower end of the upper valve rod section or member 16 is formed or provided with a head 20 (see Fig. 5) having a downwardly facing tapered projection 18 adapted to snugly fit in the recess 19ᵃ and also provided with downwardly extending lugs or the like 22 located on opposite sides of said tapering projection 18. The inner face 22ᵃ of each lug 22 is shown to be formed with a slight downward and outward inclination so that a slight recess 22ᵇ is provided between said inner face and the opposing or outer face of the upstanding projection 19. The downwardly facing lugs 22 are received by recesses 21ᵃ formed in the head 21 and said lugs 22 and recesses 21ᵃ are shown to be rectangular in cross-section in Figure 1 so that when the two members are coupled together as shown in Figures 1 and 3 they will rotate in unison either to the right or to the left without being displaced or subjecting either section or member of the valve stem or rod to end thrusts.

The separable joint formed between the upper valve rod section 16 and the lower valve rod section 15 is located slightly above the joint formed between the upper pipe section 7 and the adjacent lower pipe section, which is located at the usual ground line or plane above which the upper portion of the standpipe projects.

The upper valve rod section or member 16 is provided with an integral collar or the like 23 which is engaged by a sleeve gland nut 24 and which serves to hold said upper end against upward movement on the cap plate 25, which is mounted by the bolts 26 on the upper end of the section 7. The upper portion of the section 16 also carries a bearing or the like 27 and is formed with a squared upper end or the like 28, whereby a key or similar tool may be applied thereto and the valve rod operated to open or close the valve 2. A gland nut 29 is threaded upon the sleeve nut 24 as in the usual practice and a cap 30 is located upon the shoulder 7ᵃ to enclose the cap plate 25 and the gland. The pipe section 7 is formed with an outlet opening 7ᵇ which is closed by a cap or the like 7ᶜ, and when the valve is opened and the plug or cap 7ᶜ removed water will flow through the opening 7ᵇ.

The connection of the ring 10 and the collars of the rod section 15 secure the rod section 15 against upward vertical motion while permitting said section to rotate in either direction. The connection between the upper portion of the valve rod section 16 and the cap plate 25 prevent the rod section 16 from working upwardly to disconnect the heads 21 and 20 and permits of the rotation of the upper valve rod section 16 in either direction.

When the hydrant has been properly positioned and coupled with a water main or the like and the upper portion of the stand pipe, which projects above the ground is struck a heavy blow so as to completely disrupt or break it asunder the head 20 will readily separate from the head 21 if the thrust exerted by the blow is in an upward direction and if in a downward direction said head 20 will have a hinging or rocking movement upon the head 21. In practically all such cases the direction of the blow is horizontal and when pressure from such a blow is transmitted laterally to the upper valve rod section 16 it will separate by a rocking movement from the valve rod section 15 without subjecting the lower valve rod to unusual strain or opening the valve 2. This rocking action is facilitated by the inclined lug faces 22ᵃ and the recesses 22ᵇ formed between said lug faces 22ᵃ and the opposing faces of the projection 19.

When the upper valve rod section has been displaced by a collision such as is herein described or by a blow of any kind the joint between the sections 7 and the adjacent upper section may be opened and a new section 7 and the necessary equipment therefor connected in place or a suitable outlet provided and the valve operated by means of a suitable tool applied to the head 21.

The inter-locking heads 20 and 21 remain connected at all times until the stand pipe has been injured as described and are never separated by the normal operation of the valve stem.

Having described my invention I claim:

1. A hydrant consisting of a stand pipe adapted to be partly buried in the ground and provided with means forming an inlet for water thereinto, a valve for closing said inlet, a valve rod in said stand pipe for operating said valve, said valve rod comprising a plurality of sections, means for holding the lower section against upward movement and means for holding the upper section against upward movement, said valve stem sections having a coupling connecting the same at their meeting ends adapted to lock said sections against relative rotation in either direction and to permit of the separation of said upper valve rod section from said lower valve rod section by displacement without breakage of said coupling or said sections.

2. A hydrant including a valve, a valve rod for operating the valve, said rod being made up of separable sections, independent means for holding each section against upward movement, and a coupling interlocking the two sections against relative rotation in either direction and adapted to permit one of said sections being displaced from the other section without operating the valve.

3. A hydrant including a valve, a valve rod for operating the valve consisting of separable sections, independent means for holding each section against upward movement, and means interlocking the two sections against relative rotation in either direction and adapted to permit one of said sections being displaced from the other section without operating the valve.

4. A hydrant consisting of a standpipe, a valve therein, a rod for operating said valve consisting of a plurality of sections, means for holding each of said sections against upward movement and a coupling for interlocking said sections against relative rotation consisting of interfitting heads, one of said heads being provided on each section and one of said heads having recesses therein the other head having a lug or lugs to fit in said recesses.

5. A hydrant consisting of a standpipe, a valve therein, a rod for operating the valve and including separable sections, said standpipe including separable sections, one of said rod sections having a collar, a cross member engaging said collar and secured between the meeting ends of said standpipe sections for holding the member having said collar downwardly, and means connecting the rod sections to interlock them against relative rotation and adapted to permit of one of said sections to be displaced on the other section.

6. A valve operating rod for standpipes consisting of a plurality of sections, one of said sections having a head provided with a lug and the other section having a recess to receive said lug, the lug serving when fitted in said recess to interlock the members against relative rotation and the heads being so constructed as to permit one of said sections being displaced on the other without breakage of said coupling.

7. A valve operating rod consisting of a plurality of sections, one of said sections having a head provided with an upstanding projection having a tapering recess therein, said head also being provided with one or more recesses disposed laterally of said tapering recess, the other section being provided with a head having one or more lugs to fit in said last named recess or recesses and downwardly facing projections to fit in the tapering recess, the last named head having an unbinding rocking action upon the first named head when lateral pressure is applied upon the section thereof.

8. A fire hydrant consisting of a standpipe a valve seat in the lower end of said standpipe, a valve for the seat, a rod having threaded operative engagement with the valve, said stand pipe having a breakable joint at the normal ground line, said valve rod having separable sections, one of said sections having a coupling element and the other of said sections having a coupling element, the two coupling elements being locked against relative rotative movement but permitting a separation of the rod sections under a lateral thrust, without breaking the rods or the coupling elements.

Signed by me at Indian Orchard, Mass.

ERNEST CHARLAND.